(12) United States Patent
Adler et al.

(10) Patent No.: US 6,275,599 B1
(45) Date of Patent: Aug. 14, 2001

(54) COMPRESSED IMAGE AUTHENTICATION AND VERIFICATION

(75) Inventors: Roy L. Adler, Chappaqua; Bruce P. Kitchens, Millwood; Charles P. Tresser, Mamaroneck; Chai W. Wu, Ossining, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,354

(22) Filed: Aug. 28, 1998

(51) Int. Cl.[7] .................................................. G06K 9/00
(52) U.S. Cl. .................................................... 382/100
(58) Field of Search ........................... 380/54, 3, 4, 23, 380/55, 10, 49; 283/73, 113, 17; 382/100, 232, 233, 244, 248, 250, 251; 348/403, 473; 713/176

(56) References Cited

U.S. PATENT DOCUMENTS 6,037,984 * 3/2000 Isnardi et al. ...................... 348/403
6,064,764 * 5/2000 Bhaskaran et al. ................. 382/183

* cited by examiner

*Primary Examiner*—Samir Ahmed
(74) *Attorney, Agent, or Firm*—McGuireWoods, LLP; Stephen C. Kaufman (57) ABSTRACT

A watermarking method involves mostly invisible artifacts and is sensitive to any modification of the picture at the level of precision rendered by the compressed version of the image. The image is compressed according to a known compression standard, such as the JPEG standard, and with a fixed quality setting. Using the JPEG standard, the original image is cut into blocks to which the Discrete Cosine Transform (DCT) is applied and the DCT coefficients quantized. The watermark according to the invention is applied to the quantized DCT coefficients. This is done using an encryption function, such as a secret key/public key algorithm. The JPEG compression is then completed using a lossless compression scheme, such as Huffman coding, to produce the compressed and watermarked image. Authentication of the compressed and watermarked image begins with a lossless decompression scheme to obtain the set of quantized DCT coefficients. The coefficients are authenticated, and the DCT output of each block is dequantized. If necessary, an inverse DCT is applied to each block to output the decompressed watermarked image.

13 Claims, 12 Drawing Sheets

COMPRESSED IMAGE AUTHENTICATION AND VERIFICATION

BACKGROUND OF THE INVENTION

1. Field of the Invention

The present invention generally relates to imperceptible watermarking of images and, more particularly, to watermarking implemented on the compressed version of an image in a way that allows the usage of public key cryptography.

2. Background Description

The image to be watermarked is assumed to be in digital form. An imperceptible watermark (hereafter watermark for short) is defined as an alteration of the data set which is mostly not perceptible to a human, but can be recognized by a machine such as a computer. Otherwise, the watermark should be (mostly) invisible. The general principle of such a watermark has been disclosed, for instance, in "Digital Watermarking for High-quality Imaging", by M. M. Yeung, F. C. Mintzer, G. W. Braudaway, and A. R. Rao, Proceedings of the IEEE Signal Processing Society Multimedia Workshop, Princeton, N.J., 1997. Here we are interested in fragile watermarks, by which we mean watermarks which allow the recognition that an image is authentic and has not been altered, rather that in robust watermarks which are mainly devoted to establish ownership. Such fragile watermark schemes already exist with several virtues as for example in copending U.S. patent application Ser. No. 09/059,498 to D. Coppersmith, F Mintzer, C. Tresser, C. W. Wu, and M. M. Yeung, filed Apr. 13, 1998 and entitled "Secured Signal Modification and Verification with Privacy Control". Here we are interested in a fragile watermark scheme which is compatible with image compression. The discussion will be organized around JPEG compressed images, as described in JPEG Still Image Compression Standard by W. B. Pennebaker and J. L. Mitchell published by Van Nostrand Reinhold, New York, 1993. However, anybody versed in the art of computer imaging would readily understand how to adapt this invention to other compression schemes as long as the least visible information content can be extracted and modified. The choice we have made is motivated by the fact that JPEG is a widely accepted International standard for image compression.

A digitized color image could be thought of as a single $n_1 \times n_2 \times N$ array with $N \leq 3$. Here, the picture is supposed to be rectangular with $n_1$ pixels in the horizontal direction, $n_2$ pixels in the vertical direction, and 3 is the minimal number of components for a color image.

Similarly, a digitized gray-scale image could be thought of as a single $n_1 \times n_2$ array. The description of an embodiment of the invention focuses on gray-scale images; however, the invention is readily applicable to other data sets in more general sense, so that the word "image" could be replaced by any other human perceptible data sets such as color images or video. For definiteness, we will assume in the sequel that $n_1 = n_2 = 512$, but more general cases would be treated by an obvious adaptation of what will be presented here. In particular, the essential invisibility of the artifacts generated by this invention should result in even less visibility for color image than for grey-scale images.

Prior Art

Prior work such as "An Invisible Watermarking Technique for Image Verification" by M. M. Yeung and F. C. Mintzer, Proceedings International Conference on Image Processing 1997, pp. II-680–683, describes watermarking schemes where the owner of a data set incorporates an imperceptible watermark into the data set. In "The Trustworthy Digital Camera: Restoring Credibility to the Photographic Image" G. L. Friedman, IEEE Trans. on Consumer Elec., vol. 39, no. 4, pp. 905–910, 1993, and in U.S. Pat. No. 5,499,294 by G. L. Friedman, a digital camera is proposed which uses cryptography to create a signature for authenticating the images generated. In the invention of Friedman, a coded message is attached to the picture to allow the authentication.

It was argued that it is better to incorporate the authenticating message into the picture in U.S. patent application Ser. No. 09/059,498 to D. Coppersmith et al., where solutions to do so were proposed. In U.S. patent application Ser. No. 08/918,163 to S. Shimizu, M. Numao and N. Morimoto, filed Aug. 25, 1997 and entitled "A System for Embedding Authentication Information into an Image and an Image Alteration Detecting System", the signature of part of an image is embedded into another part of an image.

Image watermarking algorithms have been proposed which modify the DCT coefficients as for example in "Transparent robust image watermarking" by M. D. Swanson, B. Zhu and A. H. Tewfik, Proceedings of the Int. Conf. on Image Proc., 1996, vol 3, pp. 211–214 and in "Hidden signatures in images" by C. T. Hsu and J. L. Wu, Proceedings of the Int. Conf. on Image Proc., 1996, vol.3, pp.223–226. However, these algorithms differ from the present invention in the following ways:

1. In the above prior art, the emphasis is on robust watermarks, where some error in the watermark is tolerated, whereas the current invention is used as fragile watermarks where any error in the authentication implies that the image has been tampered with.

2. In the above prior art, the DCT coefficients rather than the quantized DCT coefficients are modified in the watermarking procedure. This results in a watermark which will be changed when JPEG compression is applied by the image and thus cannot be used as a fragile watermark.

3. In the above prior art, the watermark does not depend on the image itself. This allows a malicious party to modify the image while retaining the watermark and thus resulting in an image which is still authentic. Therefore these algorithms cannot be used to test whether the image has been tampered with.

Problems to be Solved

Because of the huge size of color and even grey-scale images, and the need of lots of them in industries like car insurance or the press, there is a great advantage in keeping all images in a compressed form, for instance in the JPEG standard. If the authentication message is attached to the picture as in Friedman's invention, one can as well create the message on the basis of the compressed version of the image. What the present invention achieves is to carry over this possibility to a watermarking scheme which incorporates the authentication message in the picture compressed using a lossy compression scheme (for lossless compression schemes, one can use any watermarking scheme for uncompressed images, as in the disclosure by Coppersmith et al.). The watermarking scheme proposed here produces very faint modifications of the image which are mostly imperceptible to the eye.

SUMMARY OF THE INVENTION

It is therefore an object of the present invention to provide a watermarking method that involves mostly invisible artifacts and is sensitive to any modification of the picture at the level of precision rendered by the compressed version of the image.

According to the invention, the image is compressed according to a known compression standard, such as the JPEG standard, and with a fixed quality setting. Using the JPEG standard, the original image is cut into blocks to which the Discrete Cosine Transform (DCT) is applied and the DCT coefficients subsequently quantized. The watermark according to the invention is applied to the quantized DCT coefficients. This is done using an encryption function, such as a secret key/public key algorithm. The JPEG compression is then completed using a lossless compression scheme, such as Huffman coding, to produce the compressed and watermarked image. Authentication of the compressed and watermarked image begins with a lossless decompression scheme to obtain the set of quantized DCT coefficients. The coefficients are authenticated, and the DCT output of each block is dequantized. If necessary, an inverse DCT is applied to each block to output the decompressed watermarked image.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In order to illustrate the novelty of this invention we propose doing so in full generality, i.e., without the need to specifically use the JPEG compression format. First, a fragile watermarking for uncompressed data is where an uncompressed image is given by a sequence of numbers (often binary numbers or bits, but we will say numbers for more generality), where blocks of numbers are associated to each pixel. The numbers attached to each pixel have a different level of significance. Accordingly, an invisible watermark will consist in a machine recognizable modification of all or part of the least significant numbers. The watermark can be made image dependent by letting this modification depend on the most significant numbers and choosing this dependence to be encrypted for better protection. A lossy compressed image is also given in the form of a string of numbers (sometimes mixed with format instructions, but we can ignore those in the present discussion), but now the numbers all have possibly essentially the same significance, so that the basic watermarking idea for uncompressed data as described above cannot be applied anymore. The present invention, in essence, comprises, for example, 1. localizing those numbers such that a minimal modification of these numbers, called special numbers, leads to as invisible a modification of the image as possible (for instance, instead of the smallest absolute change in the image description as for the uncompressed image, one aims at the smallest relative change), and 2. changing all or part of these special numbers in a machine recognizable way determined, using some algorithm, in a manner depending on the non-special numbers. The algorithm here preferably chosen as some public encryption scheme, as for instance any of those described in "Handbook of Applied Cryptography" by Alfred S. Menezes, Paul C. van Oorschot and Scott A. Vanstone, CRC Press, 1997, but this is non essential for this invention.

Figure 1:
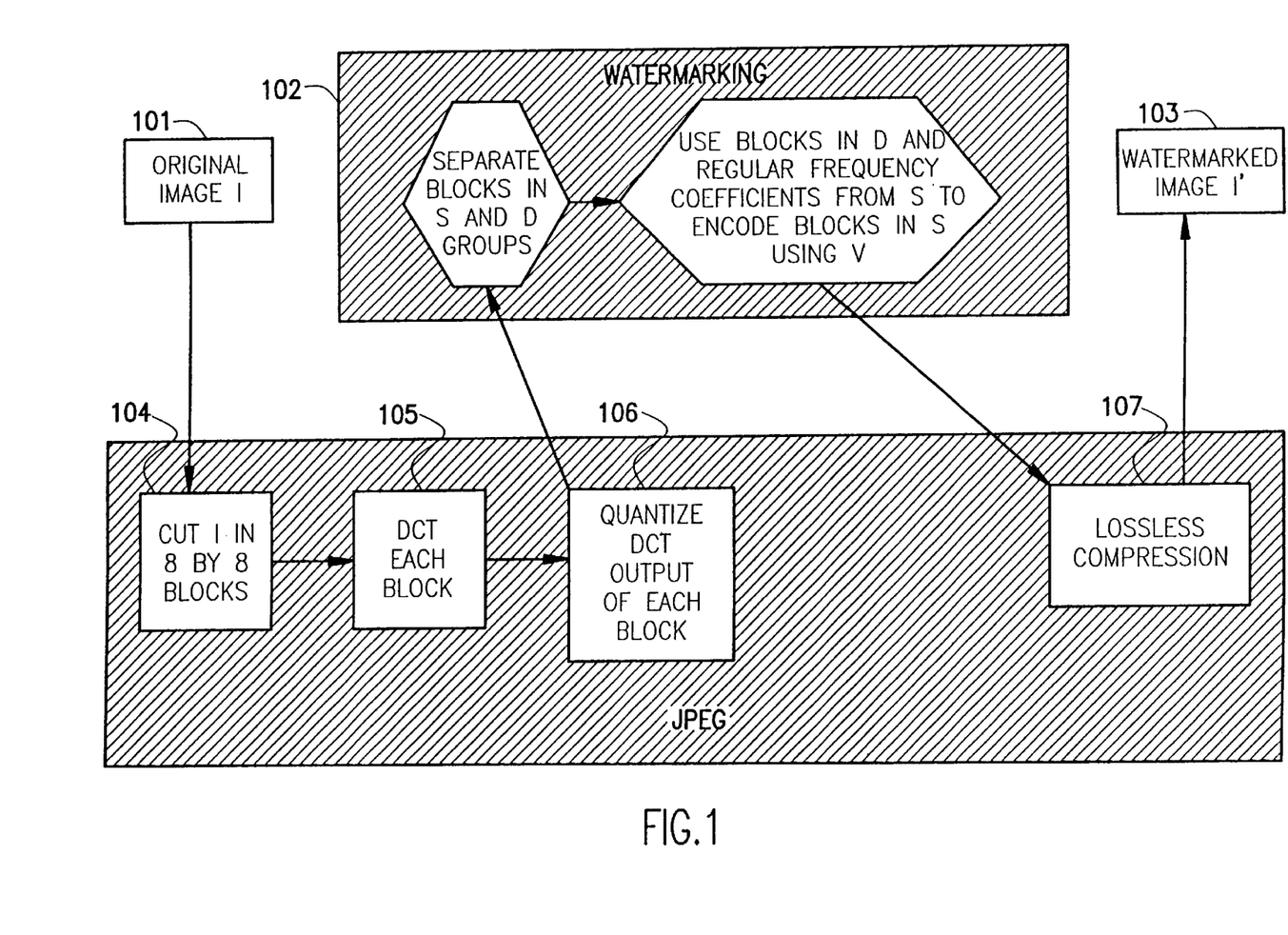
FIG. 1 is a block diagram illustrating the watermarking mechanism of JPEG compressed images.

Referring now to the drawings, and more particularly to FIG. 1, we first describe the watermarking mechanism assuming the image is compressed using the JPEG standard with a fixed quality setting. The owner of image I 101 constructs watermarked image I'=W(I) 103 by implementing the following steps. First, the image is decomposed into blocks (generically labeled B) of size 8 pixels by 8 pixels in function 104, according to the JPEG standard. Next, the DCT (Discrete Cosine Transform) 105 is applied to each block B giving an 8×8 matrix C(B) of DCT coefficients. These coefficients are then quantized by quantizer 106 to give a 8×8 matrix C'(B) of so called quantized DCT coefficients C'(i,j) with i and j between 0 and 7. C'(i,j) is defined as C(i,j)/s(i,j) rounded to the nearest integer, where s(i,j) is the quantizer step size (see the above mentioned book by Pennebaker and Mitchell, pp. 376–377). Given a matrix C'(B) corresponding to some JPEG block B, we define the pair (i*, j*) as the (i,j) pair lowest in lexicographical order such that $$|C'(i^*,j^*)|=\max_{i,j}|C'(i,j)|,$$

where the max function (greatest value function) is taken over all indices (i,j) in the block one considers. We say that a DCT coefficient C'(i,j) such that |C'(i,j)|=|C'(i*, j*)| is a special frequency coefficient, and call any other DCT coefficient a regular frequency coefficient. Information has been lost by quantization, the degree of which depends on the quality setting which in turn depends on the image application.

Normally, at the next stage the JPEG method uses a lossless compression scheme 107, such as Huffman coding for instance. According to the present invention, before the lossless compression is applied, the matrix C'(B) of quantized DCT coefficients is changed for the special frequency coefficients in blocks B which belong to some special set S. The change in function block 102, which is either +1, 0, or −1, will be determined coefficients in matrices C'(B) for blocks B in set D, where D is defined as the set of blocks not in S. The change could also be determined by further information such as date, time and location information, and so on, depending on application. The change is such that it can be extracted from the changed quantized DCT coefficients. The set of changes is called the watermark.

The rest of the JPEG algorithm (lossless encoding, etc.) is applied next. The alteration of the blocks is made so that the final product is still a valid image in the same JPEG format as the unwatermarked image. The set S of blocks can be regularly dispersed across the picture or placed differently, depending on application, typical examples being when the S blocks are dispersed according to some blue noise pattern (see FIG. 3), when S corresponds to the boundary of the image (see FIG. 4), and when S covers the image. The matrices C'(B) for blocks B in set D and the regular frequency coefficients for blocks B in S determine the change in the special frequency coefficients in C'(B) for blocks B in set S via some encryption method. In most cases, one expects that it will be preferable to use some secret key/public key pair (for short SK/PK) to encode the authentication message, but private cryptography would work just as well. For definiteness, we will assume public key cryptography (i.e., using SK/PK) is used. Instead of using single sets D and S, one can as well use a plurality of them in order to allow for authentication of pictures either cropped or modified in some inessential way.

A method to do so for uncompressed images and other uncompressed data sets has been described in U.S. patent application Ser. No. 09/059,498 to D. Coppersmith, F. et al. and the techniques described there can readily be adapted to the present invention. The above-mentioned application also discusses privacy control in the sense that images can be authenticated without the authenticating agent knowing the human-readable content of the image. Anyone of ordinary skill in the art can adapt these privacy control aspects to the present invention.

Figure 2:
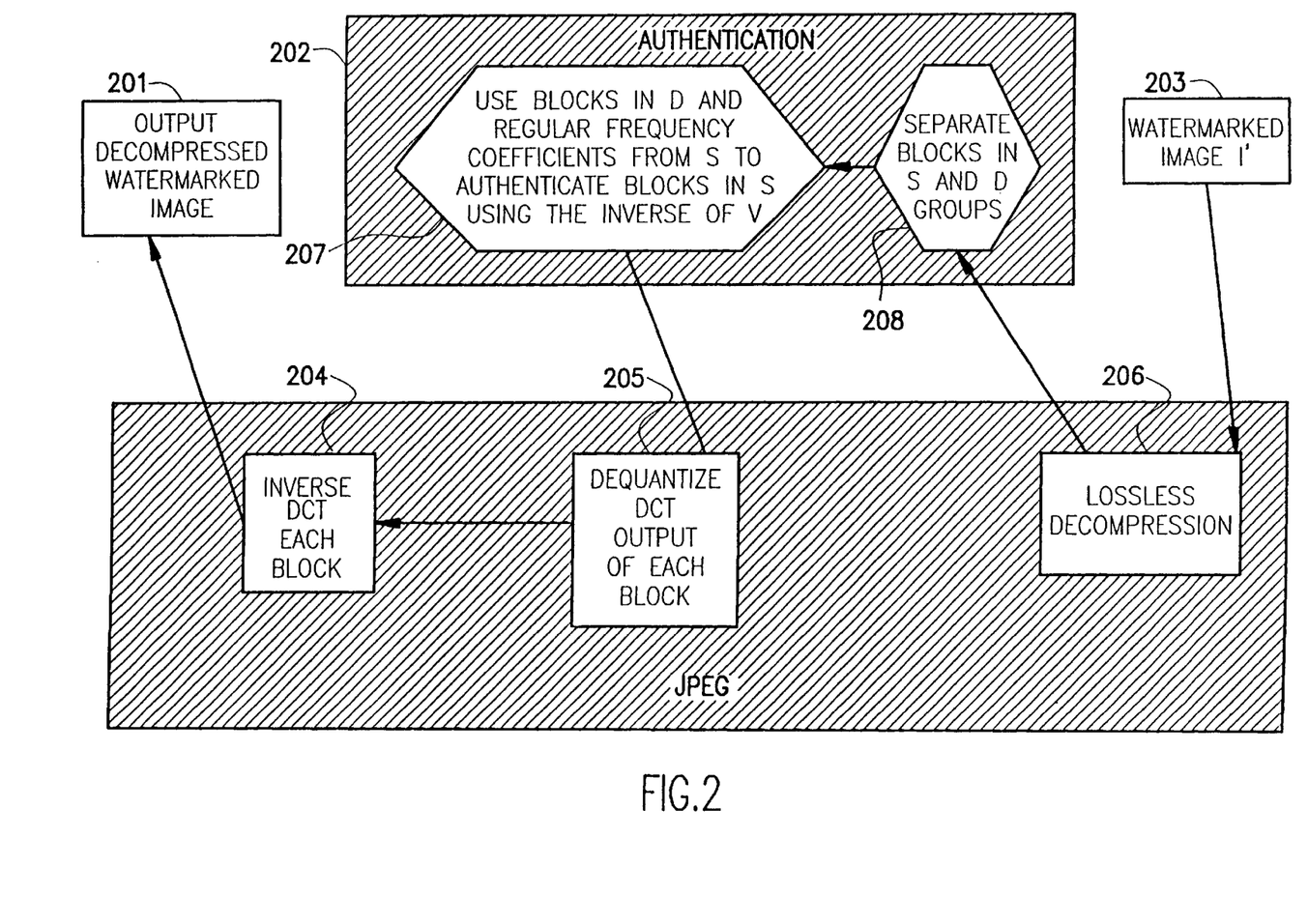
FIG. 2 is a block diagram illustrating the authentication mechanism of watermarked JPEG compressed images.

Next, with reference to FIG. 2, we describe the authentication mechanism assuming that the image is watermarked and compressed using the JPEG standard as described above. To prevent unauthorized parties from being able to watermark an image, we assume that public key cryptography with associated encoding and decoding functions V and $V^1$ are used. As is well known (see for instance Handbook of Applied Cryptography, by Alfred J. Menezes, Paul C. van Oorschot and Scott A. Vanstone, CRC Press, 1997), the function $V^1$ is known publicly, but function V is known only to some party called the owner and is secret in the sense that it is considered computationally infeasible to determine it from function $V^1$.

To authenticate a watermarked image 203 I'=W(I), one begins by decompressing the lossless compression 206 in JPEG, to obtain the set of quantized DCT coefficients. The sets D, S are identified in function 208 and one checks using $V^1$ that the watermark is compatible with blocks in D in function 207. If necessary, the JPEG decompression then proceeds by dequantizing the DCT output of each block in function 205 and performing the inverse DCT on each block to generate an output decompressed watermarked image 201.

We now describe two possible scenarios of how the invention may be used. A picture of an automobile accident is taken by a camera C with a function V only known to the manufacturer of camera C (i.e., in this case, the owner is the manufacturer of C, and not the person willing to use the watermarking scheme). Both the owner of the automobile and the insurance company are protected against possible tampering with the image. As a second scenario, the criminal justice system can use this invention to provide tamper-resistant fingerprint and photograph records. In this case, V can be kept secret by the agency generating these records, i.e., the owner and the user of the watermarking scheme are the same party.

This invention is different in two aspects from an authentication scheme where the authentication information is stored in the header portion of the JPEG file. First of all, in the present invention, the authentication information cannot be removed by simply removing the header. Furthermore, when the authentication information is stored in the header portion of the JPEG file, it is relatively easy for a third party to determine whether an image is watermarked or not (by checking whether there is a header or not), while in the present invention, as the watermark is embedded into the image itself, this is not the case. A description of the specific cryptographic techniques used (SK/PK pairs and hash functions) can be found in Handbook of Applied Cryptography, by Alfred J. Menezes, Paul C. van Oorschot and Scott A. Vanstone, CRC Press, 1997.

We now describe next a specific embodiment of the invention.

Figure 3:
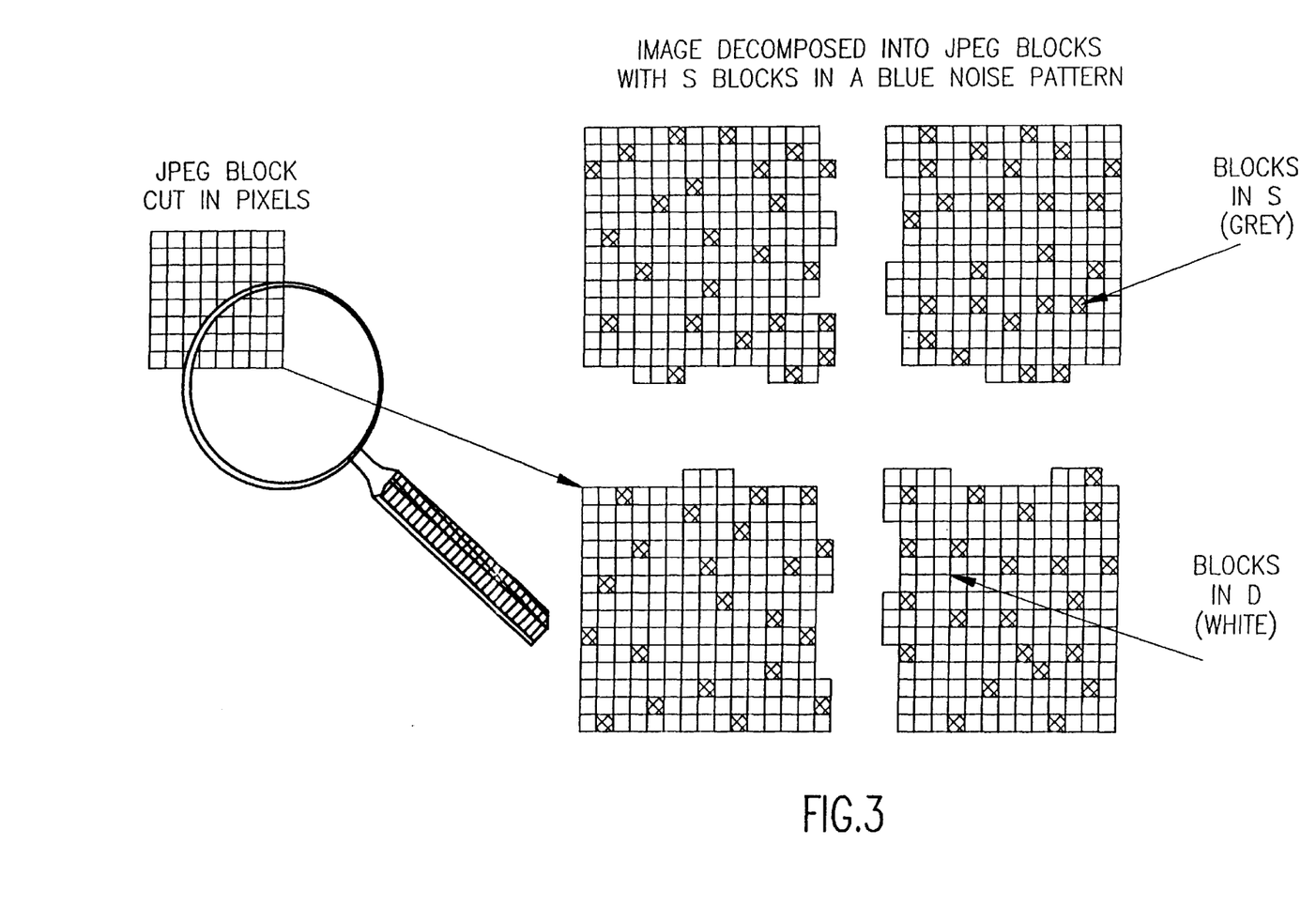
FIG. 3 is a diagram illustrating the decomposition of the image and the definition of sets D and S.
Figure 4:
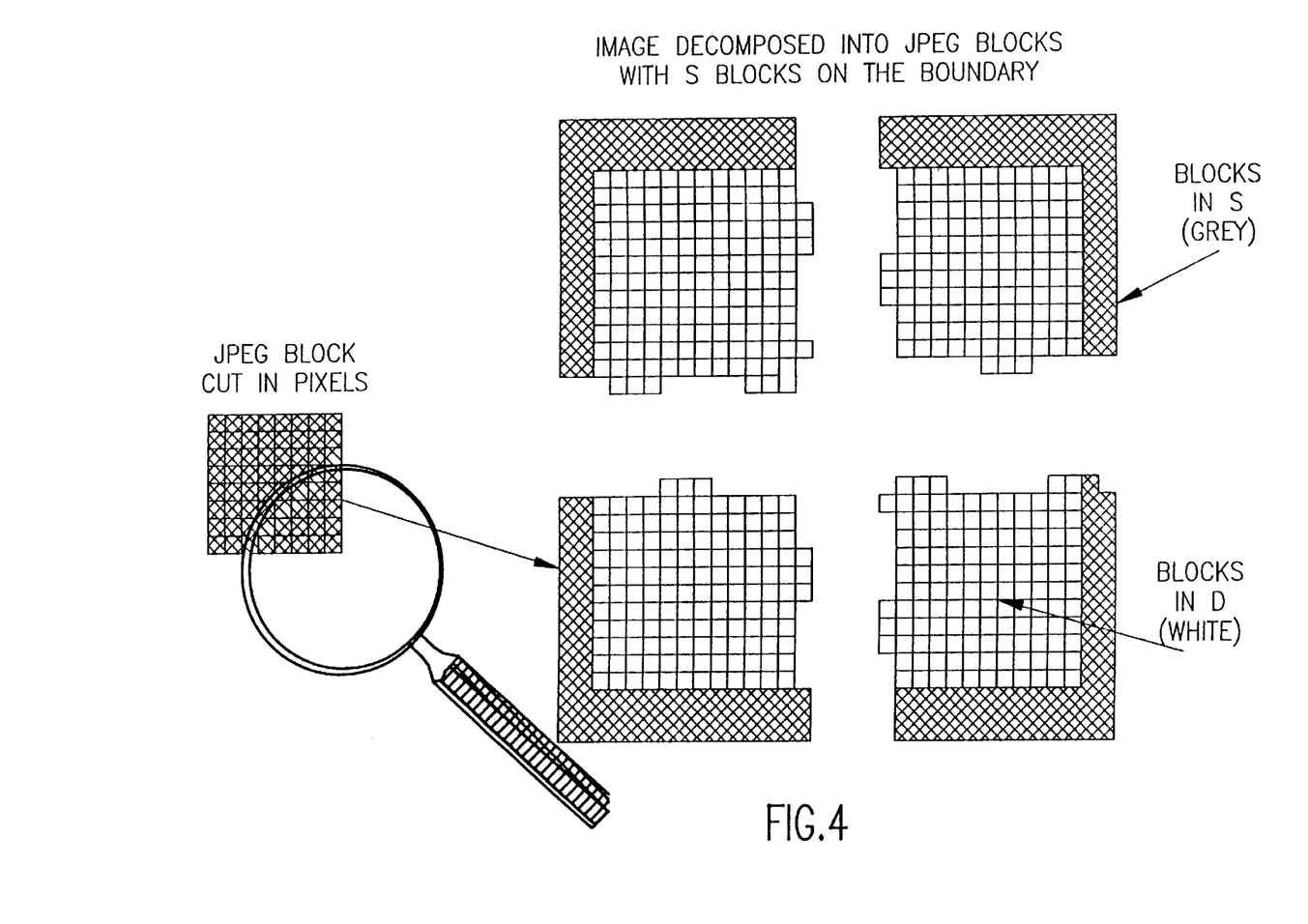
FIG. 4 is a diagram showing an alternative choice for the sets D and S.
Figure 5:
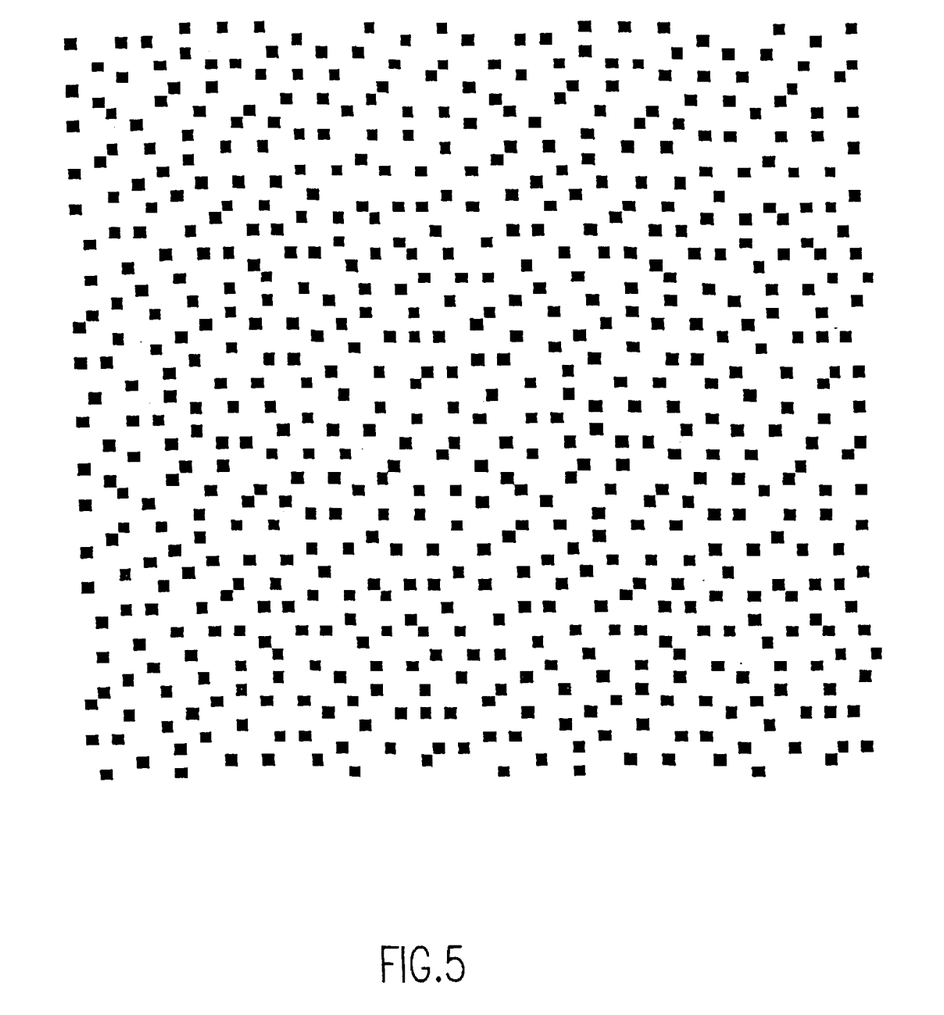
FIG. 5 is a representation of an actual blue noise pattern for a set of 616 elements in a 512 by 512 image.

With reference now to FIGS. 3 and 4, the image I consisting of 512 pixels by 512 pixels is decomposed into 8 pixels by 8 pixels JPEG blocks. (For convenience in showing I in a figure, the images I shown in FIG. 3 and FIG. 4 consists of less pixels.) Thus, the image I can be thought of as a 64 blocks by 64 blocks array. These blocks are then separated into the sets S and D, possible choices being those presented in FIGS. 3 and 5 (blue noise pattern) or in FIG. 4 (boundary of the image).

Figure 6:
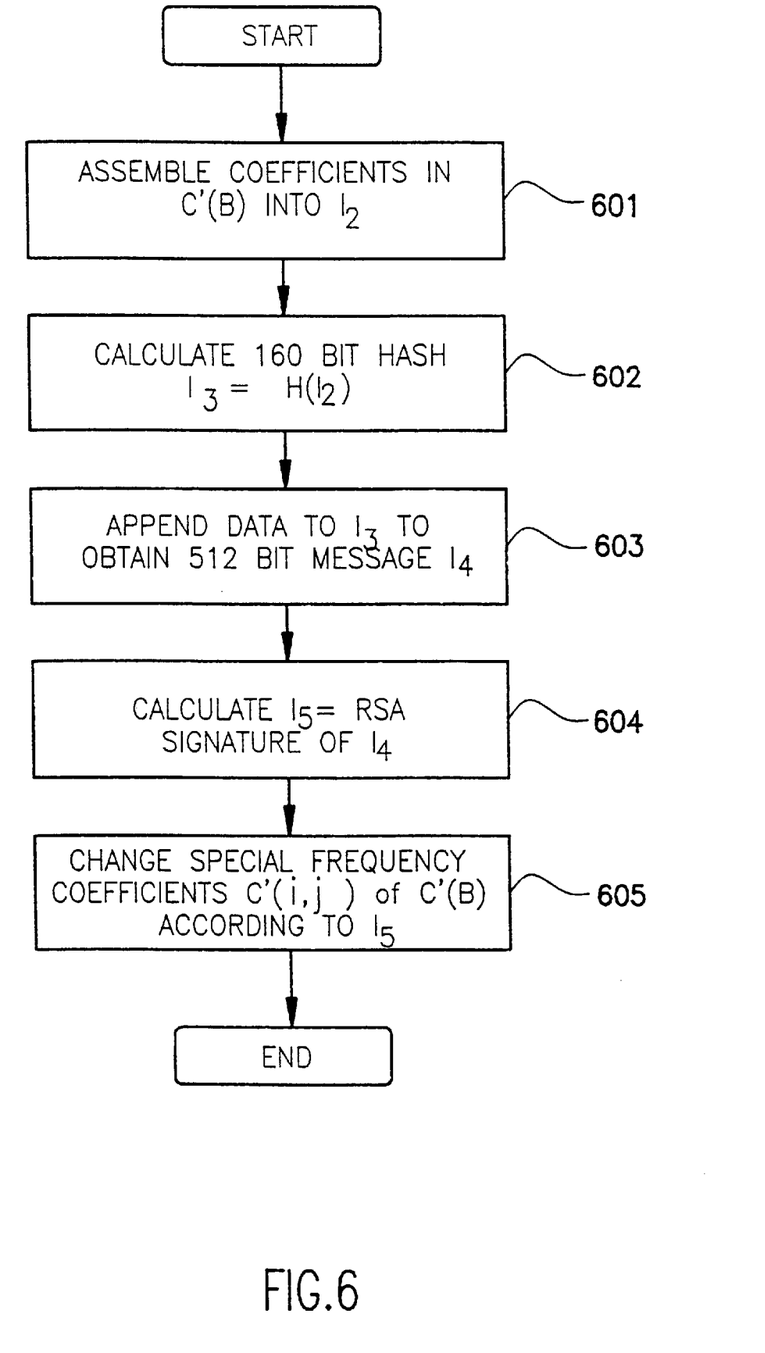
FIG. 6 is a flow diagram illustrating the algorithm for generating and embedding the watermark into the image in the preferred embodiment.

A flowchart describing how the watermark is generated and embedded into the image (102 in FIG. 1) is shown in FIG. 6. With reference now to FIG. 6, a data set $I_2$ is formed in function block 601 by combining the frequency coefficients in all matrices C'(B) from blocks B in D The data set $I_2$ is then used in function block 602 to compute the reduced data set $I_3=f(I_2)$. In several applications, f will be chosen as a hash function (to reduce the size of the data set $I_2$) or more precisely as a cryptographic hash function H which might be publicly known. Then, given any message M such as $I_2$, it is easy for anyone to produce $I_3=H(M)$, but it is considered computationally infeasible for anyone to find two different messages M and M' with the same hash value H(M)=H(M'). Also, it is considered computationally infeasible for anyone, given a hash value Y, to find a message M satisfying H(M)=Y. One such hash function is the Secure Hash Algorithm (SHA-1). Specifically, we create $I_3=H(M)$ with 160 bit where H is chosen as SHA-1 and, in function block 603, append the owner's name (or ID number), time, date, location etc., to produce a message $I_4$. We require that this additional data occupies at most 44 characters or 352 bits so that $I_4$ has 512 bits.

We choose the RSA protocol, described in U.S. Pat. No. 4,405,829, as a method to generate and use a SK/PK pair in order to allow for public authentication. Several other methods for encryption such as DES could also be used, not necessarily of the SK/PK type. The signing function in the RSA protocol is denoted by SIGN=V and the verification (authentication) function in the RSA protocol is denoted by VERIFY=$V_1$.

Next, in function block 604, compute the RSA signature $I_5$=SIGN(SK,$I_4$) of 512 bits (604). For each block B in S, we associate 1 bit b ∈{0,1} of $I_5$, and in function block 605, we change the special frequency coefficient C'(i*, j*) of the matrix C'(B) depending on this bit according to the following scheme.

Figure 7:
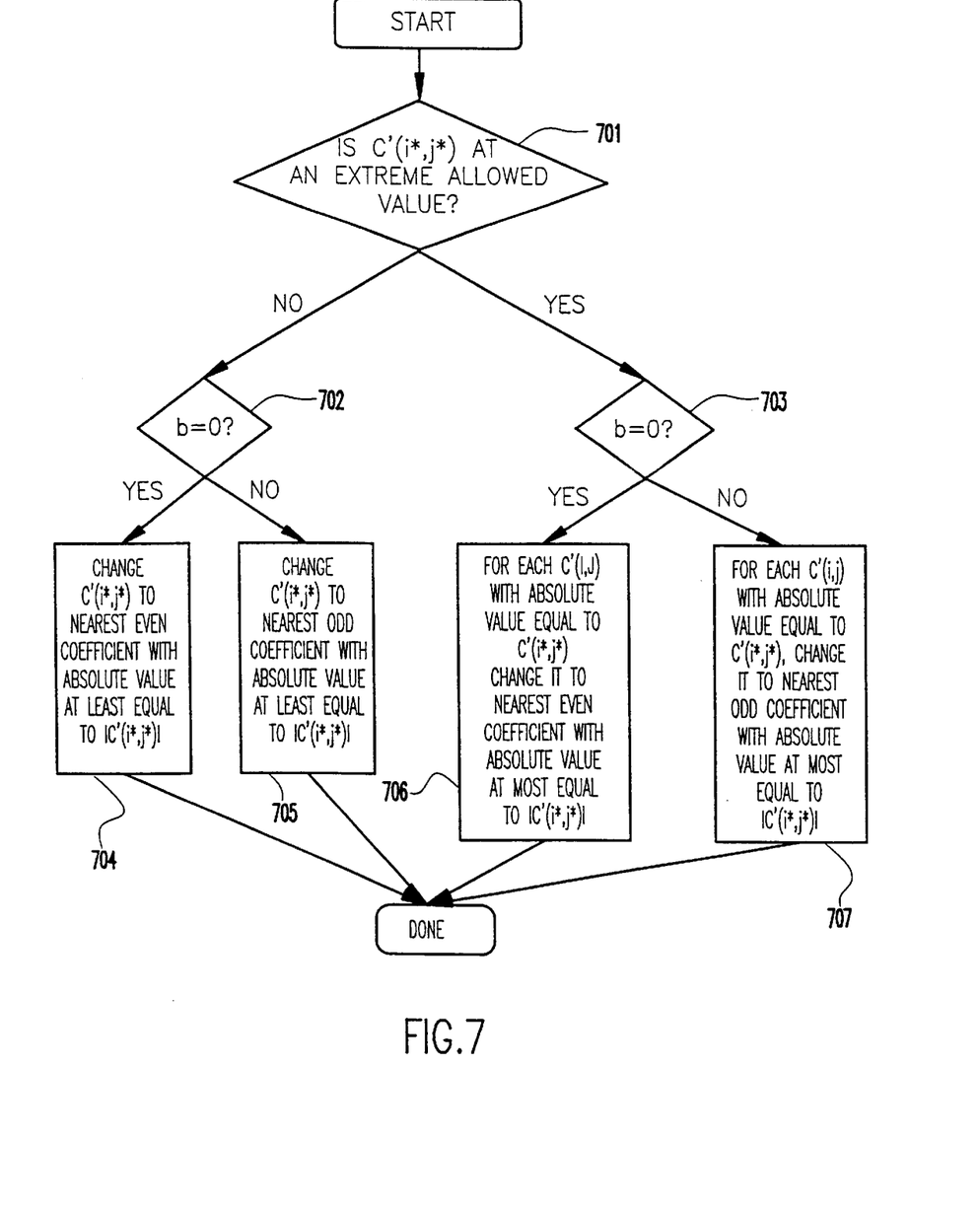
FIG. 7 is a flow chart illustrating the algorithm used to modify the coefficients C'(B)

With reference to FIG. 7, There are two cases to consider at decision block 701. For each block, the pair (i*, j*) is determined as before. The first case is when C'(i*, j*) is not at an extremity of the allowed values. The rest falls into the second case. In case 1, decision block 702, if b is the bit associated with B, we change the coefficient C'(i*, j*) in C'(B) to the nearest coefficient with the same parity as b and with absolute value at least equal to |C'(i*, j*)| in function blocks 704 or 705. For example, suppose that b=0. If C'(i*, j*) is even, we do not change C'(i*, j*). If C'(i*, j*) is odd, C'(i*, j*) is changed to the nearest even coefficient with absolute value greater than |C'(i*, j*)|. In case 2, in decision block 703, for each coefficient C'(i,j) in block B with absolute value equal to |C'(i*, j*)|, we change it to its nearest coefficient with the same parity as b and absolute value less than |C'(i*, j*)| in function blocks 706 or 707.

The set S must contain at least 512 blocks, now considered as bits. We choose 616 bits as an example, both in FIGS. 4 and 5. Out of these bits, 512 are used for $I_5$ so we are left with 616−512=104 bits left for other data: these 104 bits are called the spare bits (there is no necessity for spare bits, but these can be used for instance to place uncoded information or extra protection). In all cases when SK/PK pairs are used, the owner's name, time, and public key PK, are assumed to be available to the appropriate parties. One possibility is to embed the owner's name and the time in the spare low bits.

Figure 8:
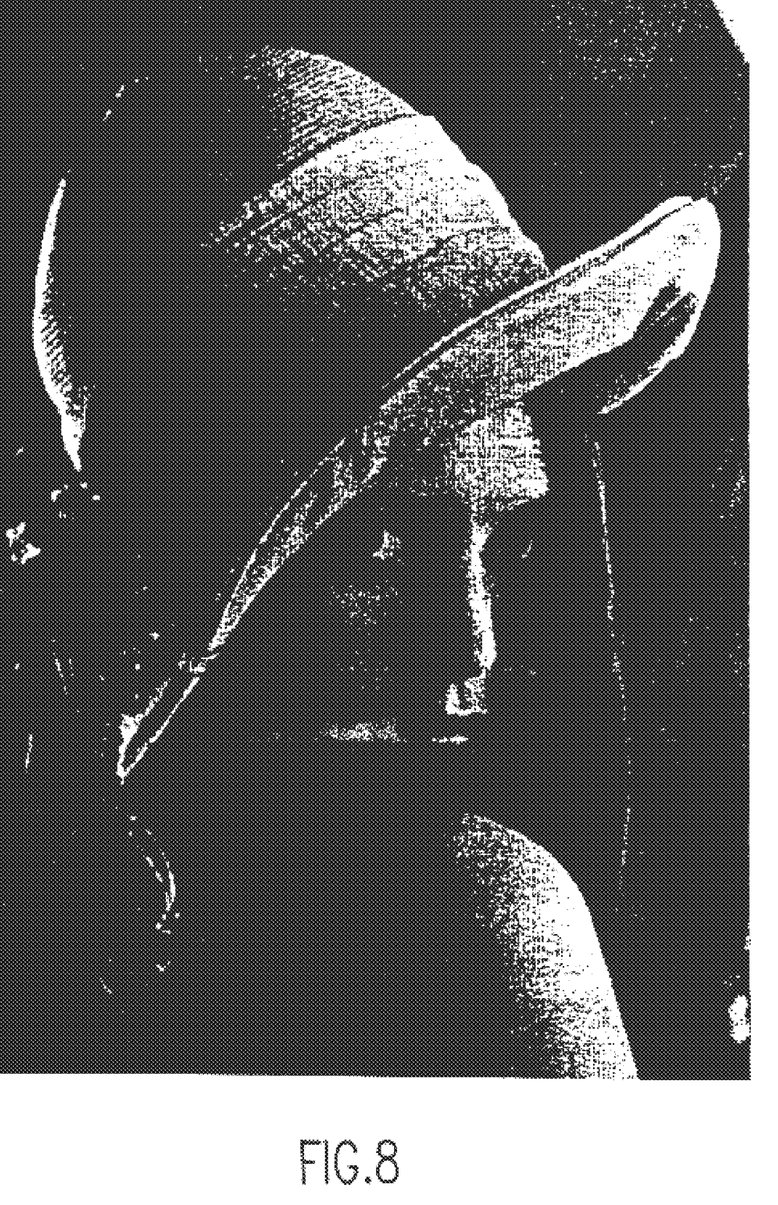
FIG. 8 represents an original grey-scale image.
Figure 9:
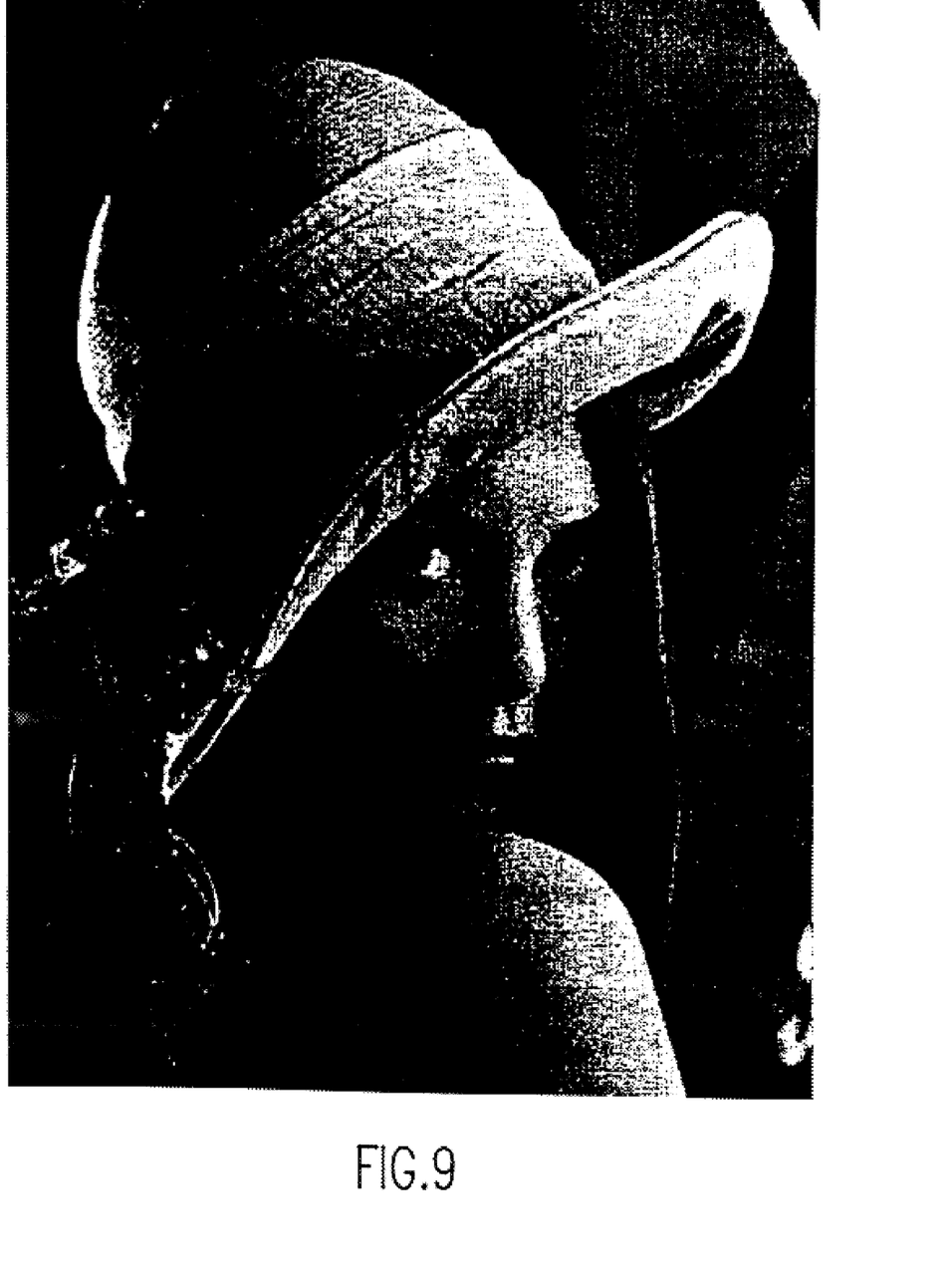
FIG. 9 represents the same grey-scale image after JPEG compression.
Figure 10:
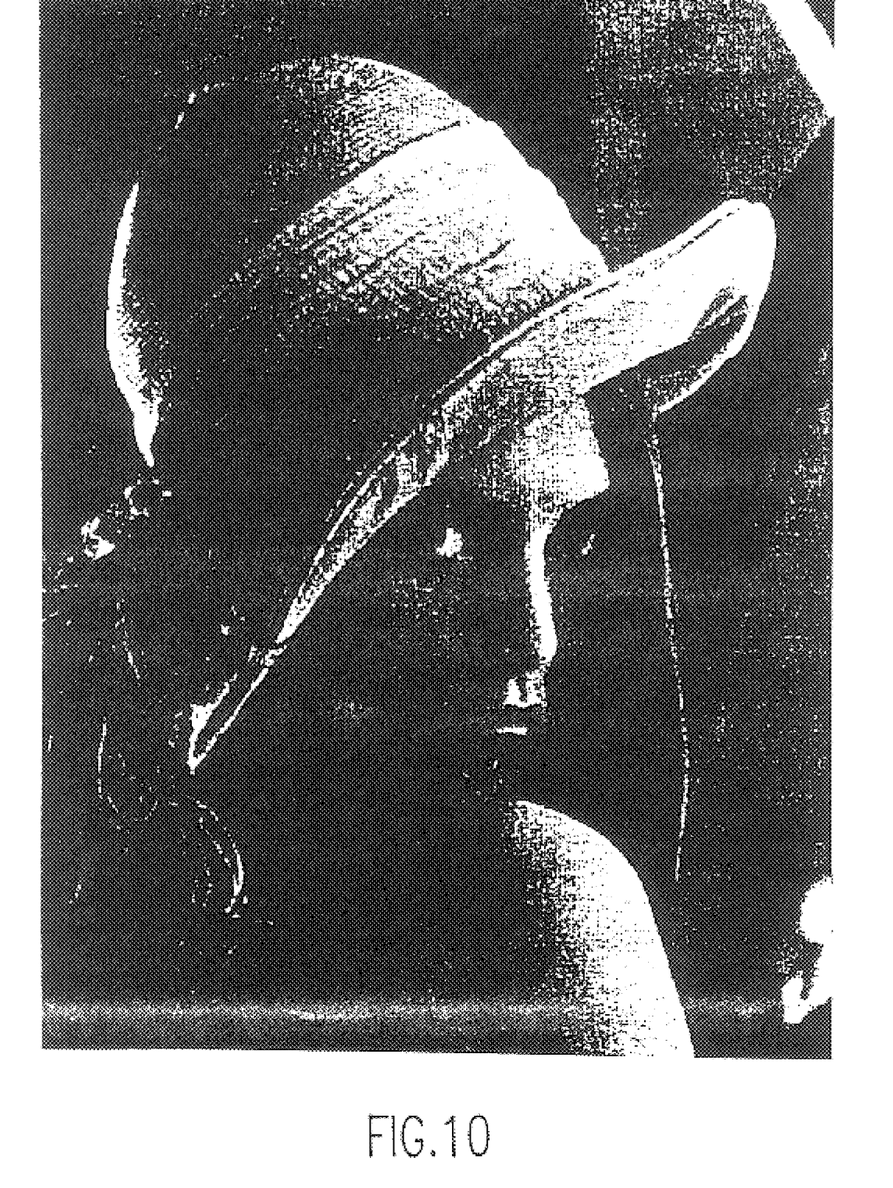
FIG. 10 represents the same grey-scale image after JPEG compression and the application of the disclosed watermark with the set S corresponding to FIG. 5.
Figure 11:
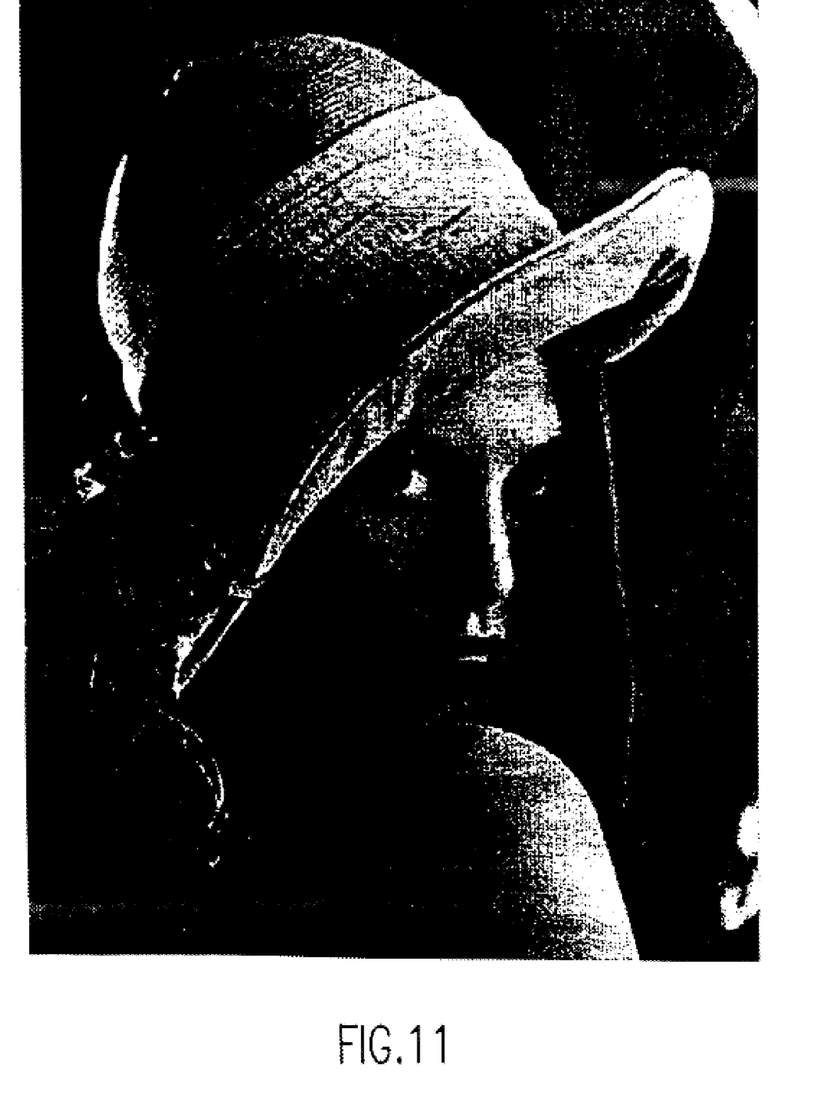
FIG. 11 represents the same grey-scale image after JPEG compression and application of the disclosed watermark with the set S corresponding to FIG. 4.

Comparing FIGS. 8 to 11 will illustrate the quasi invisibility of the watermark. FIG. 8 shows the original image while FIG. 9 shows the image after compressed with JPEG using standard quality settings. FIG. 10 shows the same image compressed with JPEG and with a watermark embedded according to set S in FIG. 5. FIG. 11 shows the same grey-scale image after JPEG compression and application of the disclosed watermark with the set S corresponding to FIG. 4. We see that FIGS. 10 and 11 are virtually indistinguishable from FIG. 9.

Figure 12:
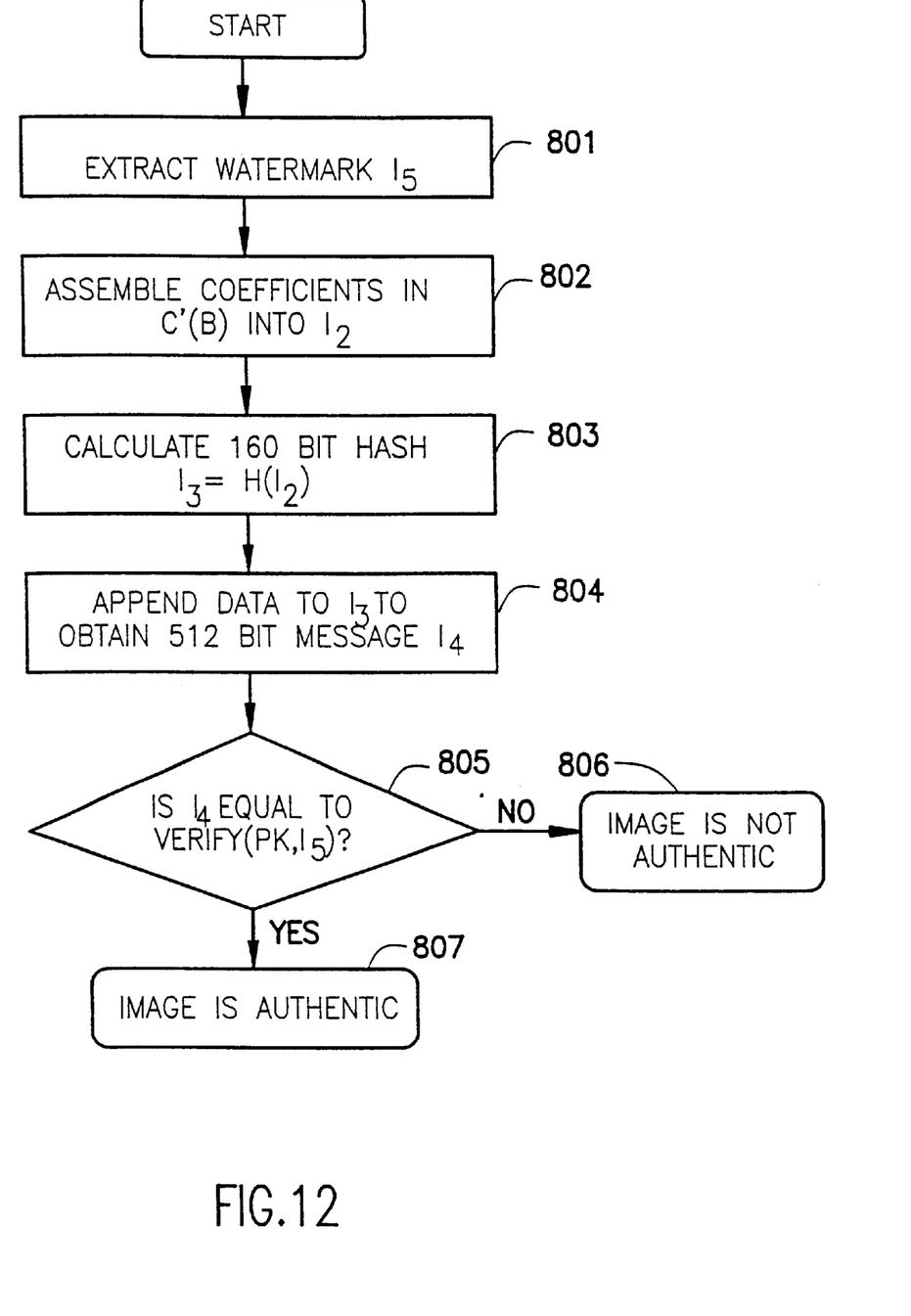
FIG. 12 is a flow diagram illustrating the algorithm for authenticating the image using the coefficients in C'(B) in the preferred embodiment.

Later, one wishes to verify that a data set is both authentic and preserved in its original form. A flowchart describing the verification procedure from the coefficients of C'(B) (202 in FIG. 2) is shown in FIG. 12. With reference to FIG. 12, after decompressing the lossless decoding, the watermark $I_5$ is extracted in function block 801 and $I_4$ is computed in function blocks 802–804 from the coefficients C'(B) of the data set as before. $I_5$ can be extracted by looking at whether C'(i',j') in C'(B) for B in S is even or odd (even corresponding to a bit 0 and odd corresponding to a bit 1), where (i',j') is defined as any pair (i',j') such that $$|C'(i',j')|=\max_{i,j} |C'(i,j)|.$$

Next, VERIFY (PK,$I_5$) is computed and a check in decision block 805 is made to check whether $I_4$ is equal to VERIFY (PK,$I_5$). (All this can be done with information available to the appropriate parties.) If $I_4$ is equal to VERIFY(PK,$I_5$), then the image is authentic at output 807. Otherwise, the image is not authentic at output 806.

Although JPEG lossy compression is used throughout this disclosure, this invention can be adapted to other compression algorithms such as MPEG, Wavelet or JBIG-2 by anyone skilled in the art as long as the least visible information content can be extracted and modified. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for watermarking an image to allow authentication and verification of the image comprising the steps of:

quantizing the data describing the image;

separating the quantized data into a first group and a second group;

modifying a subset of largest entries of frequency coefficients in the quantized data in the first group so that the modified data remain within an original set of allowable quantized data.

2. The method of claim 1, wherein the modifications to the first group are determined by at least one of (i) unmodified quantized data in the second group and (ii) predetermined data.

3. The method of claim 1, wherein the first group is determined as the quantized data where allowable modifications will be among the least visible.

4. The method of claim 1, further comprising the steps of:

decomposing the image into a plurality of blocks;

quantizing each of the blocks;

separating the quantized blocks into a first group data block and a second group data block;

determining the watermark by using the second group data block and components of the first group; and modifying the first group using an encryption function to embed the watermark.

5. The method of claim 4, further comprising transforming the blocks before being quantized.

6. The method of claim 5, wherein said transforming includes Discrete Cosine Transform.

7. The method of claim 4, wherein the transforming and quantizing each of the blocks are carried out according to the JPEG compression standard.

8. The method of claim 7, wherein:

watermarked image is in JPEG format, lossless compression is applied resulting in a watermarked image in JPEG format.

9. The method of claim 4, further comprising applying lossless compression after watermarking to produce a watermarked compressed image.

10. A method to embed a fragile watermark in a compressed representation of an image, comprising the steps of:

modifying a subset of largest quantized Discrete Cosine Transform (DCT) coefficients of an image compressed according to JPEG format;

authenticating the originator of the image, and verifying that the image has not been modified.

11. The method of claim 10, wherein said watermark is determined as a digital signature obtained from information contained in the image and independent of a part of the information in the image that carries the watermark.

12. The method of claim 11, wherein said digital signature is computed using a public key signature scheme.

13. The method in claim 12, wherein said public key signature scheme uses an RSA public key cryptography scheme.

* * * * *